(12) United States Patent
White et al.

(10) Patent No.: US 8,832,198 B2
(45) Date of Patent: Sep. 9, 2014

(54) E-MAIL ALERT SYSTEM

(76) Inventors: Roger White, Warrenton, VA (US); Amy White, Warrenton, VA (US); Phillip White, Warrenton, VA (US)

( * ) Notice: Subject to any disclaimer, the term of this patent is extended or adjusted under 35 U.S.C. 154(b) by 106 days.

(21) Appl. No.: 13/215,735

(22) Filed: Aug. 23, 2011

(65) Prior Publication Data
US 2012/0179765 A1 Jul. 12, 2012

Related U.S. Application Data

(60) Provisional application No. 61/431,185, filed on Jan. 10, 2011.

(51) Int. Cl.
*G06F 15/16* (2006.01)
*G06Q 10/10* (2012.01)

(52) U.S. Cl.
CPC .................................. *G06Q 10/107* (2013.01)
USPC .......................................... 709/205; 709/206

(58) Field of Classification Search
CPC ...................................................... G06F 15/16
USPC ................................................ 709/204–206
See application file for complete search history.

(56) References Cited

U.S. PATENT DOCUMENTS

| | | | |
|---|---|---|---|
| 5,944,786 A * | 8/1999 | Quinn | 709/206 |
| 6,999,565 B1 * | 2/2006 | Delaney et al. | 379/88.13 |
| 7,620,735 B2 | 11/2009 | Salim et al. | |
| 7,801,959 B1 * | 9/2010 | Lennie et al. | 709/206 |
| 8,024,411 B2 * | 9/2011 | Pulfer et al. | 709/206 |
| 8,073,495 B2 * | 12/2011 | Chiu et al. | 455/567 |
| 8,320,533 B2 * | 11/2012 | Waters | 379/88.13 |
| 8,341,023 B2 * | 12/2012 | Benisti et al. | 705/26.1 |
| 2002/0032020 A1 * | 3/2002 | Brown et al. | 455/414 |
| 2004/0181587 A1 * | 9/2004 | Cao et al. | 709/206 |
| 2008/0005355 A1 * | 1/2008 | Craft et al. | 709/245 |
| 2008/0205610 A1 * | 8/2008 | Bishop | 379/93.24 |
| 2008/0294727 A1 * | 11/2008 | Moody et al. | 709/206 |

FOREIGN PATENT DOCUMENTS

WO  2004/046895  6/2004

* cited by examiner

*Primary Examiner* — David Lazaro
*Assistant Examiner* — Marie Georges Henry
(74) *Attorney, Agent, or Firm* — Whitham Curtis Christofferson & Cook, PC

(57) ABSTRACT

An e-mail sender is provided with an option to send a notification to the prospective recipient(s) of an e-mail indicating to the recipient that an e-mail has been sent to his or her attention or to a business or other entities attention. The notification can be advantageously sent by a different communications route, such as by mail, courier, telephone call, facsimile, social network, or other method. Back up notifications can also be sent on an automated basis. The notification can be sent automatically and/or sent a period of time after the e-mail is sent if an acknowledgment or reply is not received.

12 Claims, 1 Drawing Sheet

E-MAIL ALERT SYSTEM

CROSS-REFERENCE TO RELATED APPLICATIONS

This application claims priority to U.S. Provisional Patent Application Ser. No. 61/431,185 filed Jan. 10, 2011, and the complete contents thereof is herein incorporated by reference.

FIELD OF THE INVENTION

The invention pertains to communications technology, and, more particularly, to a system and method which permits the sender of an electronic mail (e-mail) to provide a notification to the prospective receiver of an e-mail that an e-mail has been sent to them.

BACKGROUND

Communications has traditionally progressed towards faster mechanisms for transmission. Individuals and businesses moved from mail service to courier service for important communications. Then, individuals and businesses moved from courier service to facsimiles. Today, e-mail is fast replacing facsimiles for both personal and business communications.

Significant efforts have been made to facilitate e-mail communications. In addition, efforts have been made to help assure that recipients receive important e-mails.

U.S. Patent Publication 2002/0032020 to Brown describes an e-mail alert system where, when a person is sent an e-mail and he or she is not in the vicinity of his or her computer, he or she is informed of the e-mail by an "alert" apparatus (e.g., a PDA, phone, pager, radio, television, buzzer, lights, or an audible device). Thus, Brown is concerned with the "recipient" being able to timely obtain e-mails and to respond to them. The recipient could, for example, receive a page notifying him of the presence of an e-mail so that he or she could then log on to a computer and retrieve the e-mail.

U.S. Pat. No. 7,620,735 to Salim describes an e-mail system with voice interactivity. In Salim, for example, one could enter an e-mail which, rather than being sent electronically to a recipient, is directed to a service which places a call to the intended recipient and audibly reads the substance of the e-mail to the recipient. Salim also contemplates being able to convert oral answers into text which is sent as an e-mail.

One of the problems with any form of communication is assuring that a recipient receives an e-mail that a sender wants the recipient to receive. With couriers, the sender can require the recipient to sign for the document, and, once it is signed for, the sender can be notified of its receipt. With facsimiles, the sender can receive a confirmation transmission indicating that the document was successfully transmitted. With e-mails, the sender can receive an acknowledgment response when an e-mail is opened. However, many people receive a large volume of e-mails and may not open them. Further, many people use screening tools to screen out e-mails believed to be "junk mail" or "spam". Thus, with e-mails there is less surety than with other forms of communications that a document has been received, and this makes e-mail communications less reliable for certain personal and business communications.

While there are a number of technologies similar to U.S. Patent Publication 2002/0032020 to Brown where the "recipient" can take active control in his or her being able to timely obtain e-mail communications, there has not been developed an effective method or system which the "sender" of the e-mail can be assured that the recipient is notified that he or she has recieved an e-mail that is important and that he or she should read it.

SUMMARY

An exemplary embodiment of the invention is to provide a method and system by which a sender of an e-mail can notify one or more recipients of an e-mail that they have been sent an e-mail and should read it.

According to the invention, a "sender" of an e-mail is provided with an "alert" messaging service by which he or she can notify the "recipient(s)" of the e-mail that they have been sent an e-mail and should read it. Thus, in situations where the recipient does not regularly check his or her e-mail, he or she will receive an alert from the alert messaging service that he or she should check their e-mail and read the message sent by the sender. The alert messaging service may send the alert by an alternative form of communication such as the mail (e.g., USPS), courier, facsimile, pager, telephone, SMS text, or social network (e.g., FaceBook, MySpace, Google+, etc.). The "sender" could select from a menu of "alerts" at the time he or she sends the e-mail to the "recipient", and could elect from a variety of different levels of security for the "alert" the type of information provided in the "alert". In addition, the number of alerts which are provided can vary from one to a plurality depending on the needs of the sender, and different types of alerts can be used for each of a plurality of alerts (e.g., a page or text might be sent; then, a facimile or FaceBook notification might be sent; then, a phone call might be made, and so on). The alert messaging service can be configured to automatically stop sending alerts when the sender receives an acknowledgment or reply from the recipient(s).

In addition to assuring that a "recipient" is notified of an e-mail, use of the messaging system also has an advantage when an e-mail is not sent correctly to the recipient(s). Specifically, when a recipient is alerted to the presence of an e-mail, but finds the e-mail has not been received due to, for example, the "sender" typing in an incorrect mailing address or the "recipient's" screening tool screening out the e-mail as junk mail, the recipient(s) can notify the sender to re-send the e-mail and/or to provide the message by a different route of communication.

DETAILED DESCRIPTION

Figure 1:
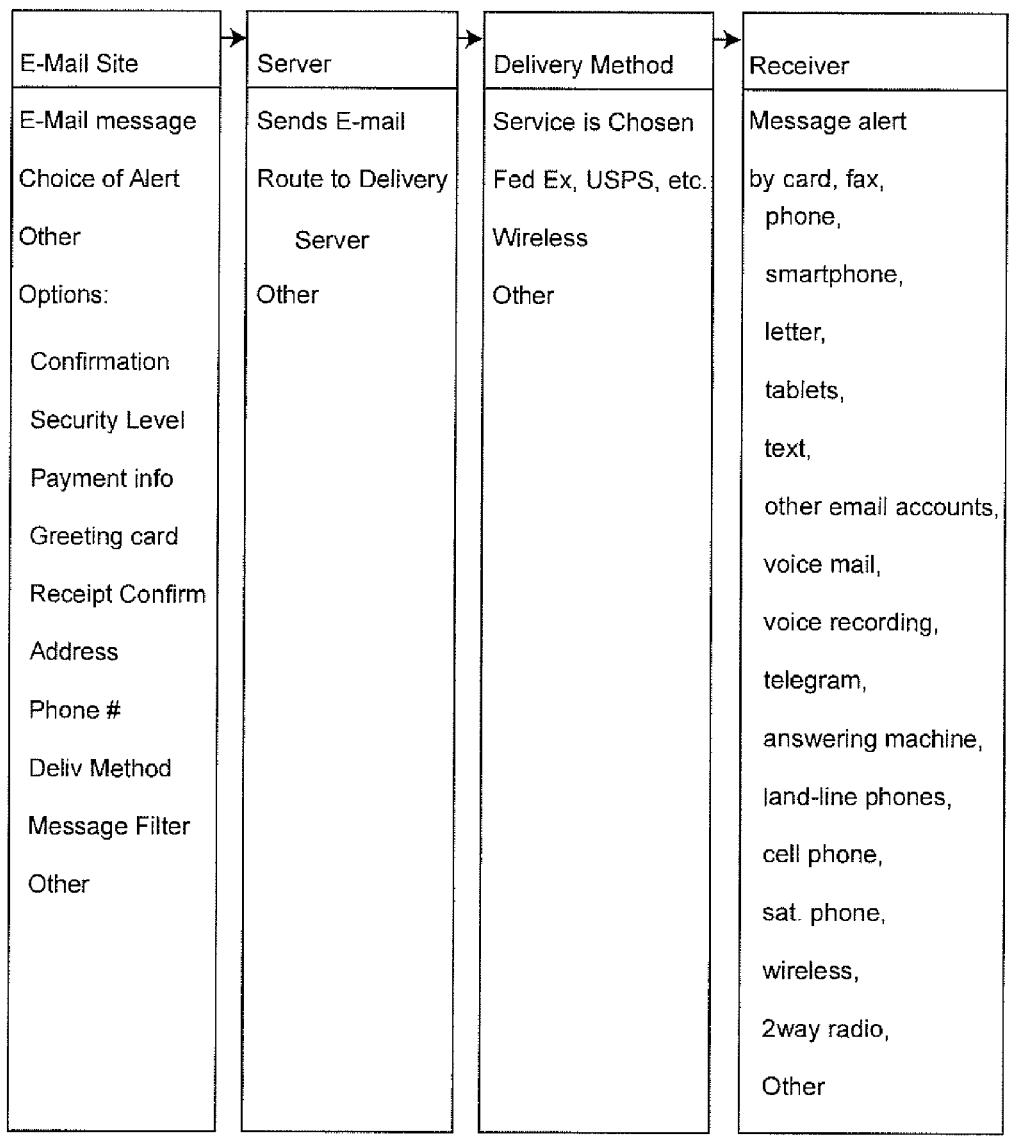
FIG. 1 is a schematic drawing illustrating a system and method for practicing an embodiment of the invention.

The inventors have noticed that many people do not have time to check their e-mail. They may be busy with personal or office related work, they may be traveling, on vacation, away from the routine schedule, or they may be elderly, sick, or may have other reasons for not checking their e-mail. Despite these issues, more and more people rely on using e-mail to transmit important business or personal communications to one another. This invention gives the "sender" of an email an option of sending another form of communication (in addition to the e-mail) to let the "receiver" or intended "recipient(s)" know of the e-mail that an e-mail has been sent to them and they should retrieve it and read it.

In an embodiment of the invention, the sender, after typing an e-mail, would simply click on a window of options that could be entitled "E-mail Sent Notification" or "E-mail alert notification" or other suitable name. Alternatively, the sender could go to an independent site and separately request a notification be sent. Further, the process could be automated such that after an e-mail is sent by the sender, an automated alert notification is sent without further action on the part of the sender. Still another embodiment of the invention could be to have a special e-mail reminder card (e.g., postcard) created by a postal service or private entity. The sender could trigger delivery of this card through an electronic menu (as discussed in more detail herein) or by simply handwriting the card in more urgent or opportune circumstances. This e-mail reminder card (postal or other) could function as an integral part of the e-mail alert system and provide a manual backup.

As is shown in FIG. 1, the e-mail site is the site where the e-mail is generated. This could be a computer in the sender's office or home. However, it could also be another electronic device such as a personal data assistant (PDA), laptop, Ipad or other tablet device, netcomputer, smart phone, telephone, cell phone, wireless or other device. In addition, the sender could send e-mails from a kiosk or cyber cafe. Collectively, for one embodiment of the invention, all of these devices will be referred to as electronic sender operated devices. The sender of the e-mail generates the e-mail to be sent at the e-mail site, and preferably chooses an "alert" notification to be sent to the e-mail recipient. The options can vary widely and include for example, a post card, a letter (sent by courier or mail), a telephone call (either recorded or voice generated, or in some applications a service where a service center employee places the call), a text message, voice message, facsimile, a social network posting (e.g., FaceBook, MySpace, Google+, etc.), other e-mail accounts, or other communications route. The "alert" will be sent to, for example, a fixed address, p.o. box, cell phone, smart phone, facsimile machine, land-line telephone, pager, portable computer, server and or computer system which services a social network, or other receiving device, fixed or mobile, which is associated with the "recipient(s)" or other receiving point designated by the sender. Thus, the sender is transmitting the e-mail to the recipient(s), as well as an alert to the recipient(s) to let the recipient(s) know about the e-mail. In an embodiment, the sender could also designate several methods of back up notification if a message is deemed to be very important.

For exemplary purposes FIG. 1 shows the sender (at the e-mail site) contacts the server (which can be within the control of the sender or a service provider) when an e-mail is sent to a recipient, and selects a delivery method for sending the alert to the receiver. In FIG. 1, the server is shown as sending the e-mail to the recipient; however, the sender could send the e-mail directly from the e-mail site and separately contact the server (in the case where the server is operated by, for example, an independent service provider) through the Internet or by other means. The server can work in concert with delivery services and/or could execute certain types of alerts to the receiver directly. For example, the server could be part of an "alert" service center which, for example, could employ one or more people to place telephone calls to the receiver to alert them about the e-mail. Or, the server could employ people to type and post a letter to the receiver by courier (e.g., Fed Ex, DHL, etc.) or the USPS or telegram services. The service provider (server) might generate, for example, synthesized or recorded voice message alerts delivered to land phones, satellite phones, or cell phones, or answering machines controlled by the recipient. In addition, the service provider may send alerts by facsimiles, two way radio communications, text messages, or social network postings.

The different routes of transmitting alerts to the recipient could be chosen by the sender from a menu of options or the different routes of transmission of alerts could be pre-set or fixed. As noted above, a plurality of different alerts could be chosen or automatically employed where, for example, alerts provided by different routes of communication at different time intervals after an e-mail is sent. Alternatively, the server could provide certain "alerts" on an automated basis (i.e., the server could be programmed to send a facsimile within a certain time period after the e-mail is sent).

Once the receiver receives the e-mail, a mechanism can be provided to automatically stop sending alerts. For example, when an automated receipt is sent upon the recipient opening the e-mail and/or when a recipient of the e-mail replies to the e-mail sender, the server can be provided with an indication that the e-mail has been received and that the "alerts" no longer need to be sent. This can be accomplished by routing the notifications and/or replies through the server and/or by the e-mail site sending, either in an automated fashion or by the sender's separate action, a message to the server indicating that the e-mail has been received.

Given that e-mail address and messages are sometimes very sensitive, the alert message can be sanitized for security purposes by various security settings. For example, a low setting could show the sender's entire e-mail address and the nature of the message, a medium setting could show just the sender's e-mail address, a high setting could show just the sender's first 3 letters of his e-mail address. Many other types of settings might be employed. In addition, in an embodiment of the invention, a setting could be created by the sender, e.g., the sender could create a message and/or other information that is unique to the sender which would be transmitted as an alert to the recipient. A "no security" setting could show the sender's e-mail address and the entire message without any security sanitation whatsoever. Preferably, the security settings would be adjustable and changeable by the sender using a Menu screen.

Payment for the alert notification service could be made by credit card, debit card, PayPal, invoicing, an account with the e-mail service provider. It would be advantageous to offer a variety of different forms for payment that could be chosen at the discretion of the sender.

Pre-designed messages might also be provided using the system. For example, greeting cards, birthday cards, illness cards, sympathy cards, birth announcement cards, invitation cards, or other cards could be chosen from a library of choices. These cards could be sent by themselves without a prior e-mail message if so desired. That is, the e-mail sender would contact the server, and have the server send the card; rather, than sending the e-mail. However, the more typical route contemplated might be for the sender to send an e-mail to the recipient, and to have the card sent by postal delivery as a follow up in the same fashion as an alert.

In another embodiment, an e-mail would be sent by a delivery service operated computer device, as opposed to being sent directly from a sender operated computer device. For example, a message form could be provided at a web site of a delivery service. The message form would be "fellable". That is the sender, rather than directly sending an e-mail from his home computer for example, would log on to the server, fill out the form, provide the prospective recipient's e-mail address, and the server would send the e-mail to the recipient. Variations on this embodiment would allow the e-mail could be created by, for example, voice recognition, typing of the information, handwriting the information, or forwarding a message that was previously created. The sender could also provide the server with a "list serv" (a plurality of e-mail addresses that should receive the message and the alert of the message) so that the same message (e.g., invitation to a party) could be sent simultaneously by the server by e-mail to a number of recipients and they each could be provided with reminder alerts by different routes of communication (e.g., a mailed invitation card). In this embodiment, in addition to providing a variety of mechanisms for providing the information for the e-mail to be sent by the server, the server could also provide a menu of back up notification choices (i.e., alerts) in the same manner as discussed in detail above.

Commercial services such as Yahoo and Google could include these follow up alert options with their e-mail server. Alternatively, service companies could contract with Yahoo or Google, or others, to use their servers and connections to provide for the back notification menu or specialty card notification for the sender.

A "Signed Receipt" box could be displayed on the menu provided by the server to notify the sender when the receiver received the message (e.g., either the alert or the actual e-mail). Preferably the date and time, as well as who signed for it (e.g., when an alert is sent by courier, the courier service can provide date, time, and signer's identity, and this information could be retrieved by the server and provided to the sender (by transmission to the e-mail site, by the sender viewing this information on the server, or by other means).

The simplest form of back up notification might be a recorded message to the receiver's cell phone which would state "you have an e-mail from (desired info chosen by the sender)" or a text message to the receiver's cell phone stating the same information. As discussed in detail above, the choice of this type of a alert could be chosen by the sender or it could be automatically provided. As discussed above, a number of similar simple alerts might also be provided using this system and methodology, and, for example, for important messages, several different types of alerts might be provided (either simultaneously or serially) to assure that the recipient obtains the e-mail.

A variation on the invention will allow the sender to use a secondary site to send back up notification (alerts) independent from the e-mail site and server where the original e-mail message is created. In this variation, after sending the e-mail message from the creation site of the message, a copy would be forwarded to the independent site of the back up e-mail or the sender of the message could go to the secondary site independently of the primary creation site and indicate which forms of back up notification he or she would prefer. In this variation, the sender would deal directly with the servicing site which provides the alert(s) for billing issues, receipt verifications, etc.

The invention has been described in terms of several exemplary embodiments. Those of skill in the art will recognize that the invention can be practiced with modification within the spirit and scope of the appended claims.

The invention claimed is:

1. An electronic mail (e-mail) method, comprising the steps of:
sending an e-mail from a sender to at least one recipient;
using an electronic sender operated device to select one or more alerts to be sent to said at least one recipient based on an instruction from said sender to alert said at least one recipient that said e-mail has been sent from said sender to said at least one recipient,
wherein said alerts are selected from the group consisting of a post card, a letter, a facsimile, a telegram, a courier, a voice message, a telephone call, a text message, and a social network posting, wherein said one or more alerts are communications other than e-mails from an e-mail account used in said sending an e-mail step; and
sending said one or more alerts to said at least one recipient, wherein said step of sending one or more alerts is performed irrespective of message screening tools of said at least one recipient.

2. The method of claim 1 wherein said e-mail is sent in said sending step from an electronic sender operated computer device which can be the same as or different from said electronic sender operated device used in said using step.

3. The method of claim 1 wherein said e-mail is sent in said sending step from a delivery service operated computer device.

4. The method of claim 1 wherein said sending said one or more alerts step is performed by an alert messaging service.

5. The method of claim 1 wherein more than one alert is provided in said sending one or more alerts step and wherein each alert is different.

6. The method of claim 1 further comprising the step of stopping said sending one or more alerts step when said e-mail message is acknowledged or replied to.

7. The method of claim 1 further comprising selecting security levels for said one or more alerts wherein said security levels provide different amounts of information identifying the e-mail sender and/or content of the e-email.

8. The method of claim 1 wherein said sending an e-mail step and said using step are performed at different sites.

9. An electronic mail (e-mail) method, comprising the steps of:
sending an e-mail from a sender to at least one recipient;
using an electronic sender operated device, to select one or more alerts to be sent to said at least one recipient based on an instruction from said sender to alert said at least one recipient that said e-mail has been sent from said sender to said at least one recipient, wherein said alerts are communications other than e-mails from an e-mail account used in said sending an e-mail step, wherein said alerts are selected from the group consisting of a post card, a letter, a facsimile, a telegram, a courier, a voice message, a telephone call, a text message, and a social network posting;
sending a plurality of alerts to said recipient,
wherein each of said plurality of alerts is different, and
wherein said sending a plurality of alerts is performed irrespective of message screening tools of said at least one recipient; and
optionally, stopping said sending step when said e-mail message is acknowledged or replied to.

10. The method of claim 9 further comprising selecting security levels for said one or more alerts wherein said security levels provide different amounts of information identifying the e-mail sender and/or content of the e-email.

11. An electronic mail (e-mail) alert system, comprising:
an electronic sender operated device which receives an indication that an e-mail has been sent from a sender to at least one recipient, or which receives instructions to send an e-mail from said sender to said at least one recipient,
wherein said electronic sender operated device selects, based on instructions from said sender, one or more alerts to be sent to said at least one recipient to alert said at least one recipient that said e-mail has been sent from said sender to said at least one recipient, wherein said one or more alerts are communications other than e-mails from an e-mail account used to send said e-mail from said sender to said at least one recipient, wherein said one or more alerts are selected from the group consisting of a post card, a letter, a facsimile, a telegram, a courier, a voice message, a telephone call, a text message, a social network posting, a wireless or other communication, a satellite telephone call, a cellular telephone call, a land line telephone call, and an internet communication modality, and wherein said electronic sender operated device causes said one or more alerts to be sent to said recipient irrespective of message screening tools of said at least one recipient.

12. The e-mail system of claim 11 wherein said electronic sender operated device stops causing said one or more alerts to be sent to said recipient when said e-mail message is acknowledged or replied to.

* * * * *